UNITED STATES PATENT OFFICE.

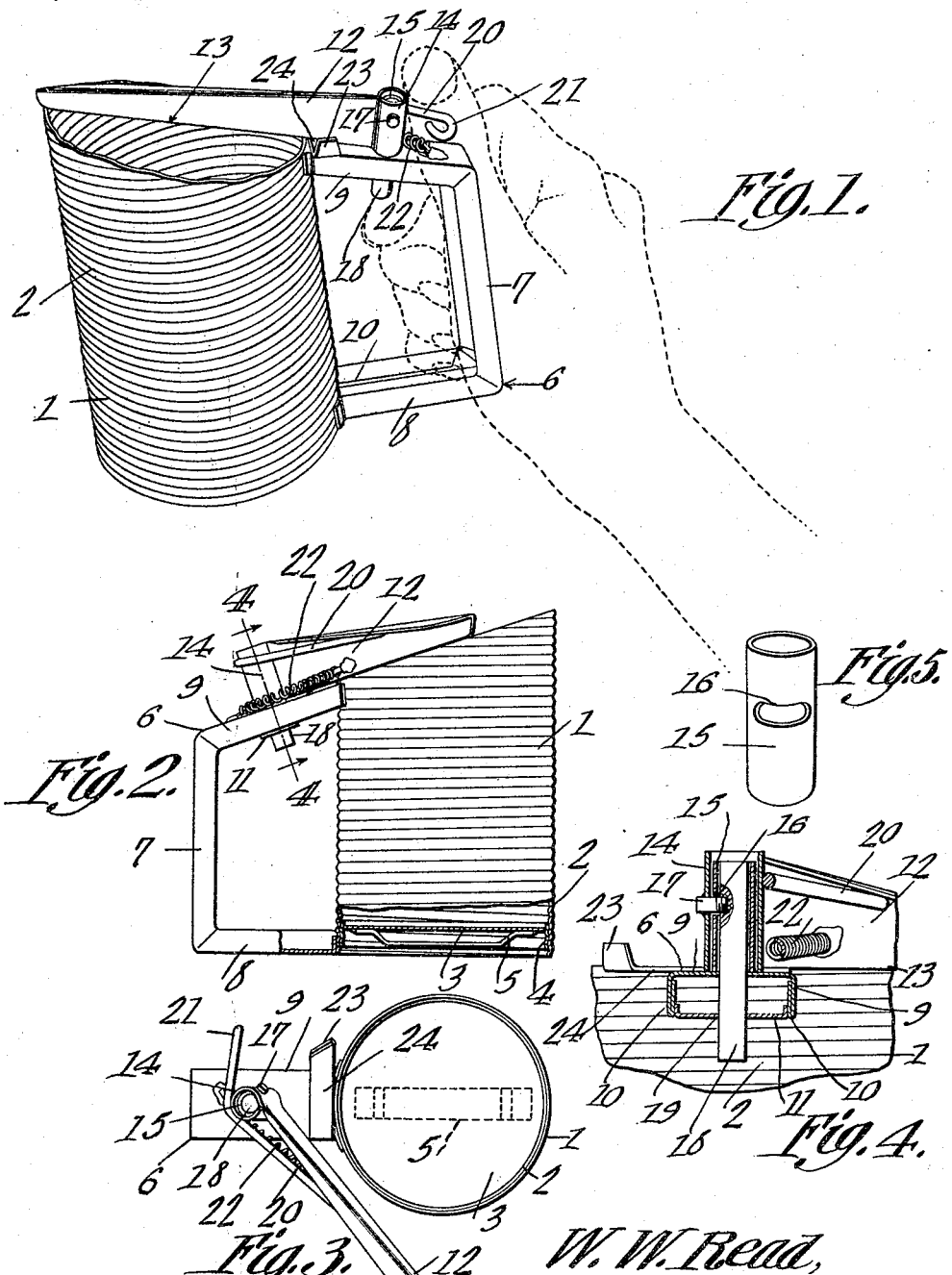

WILLIAM WALLACE READ, OF SAN ANTONIO, TEXAS.

SCOOP.

1,202,101.  Specification of Letters Patent.  Patented Oct. 24, 1916.

Application filed August 28, 1915. Serial No. 47,822.

*To all whom it may concern:*

Be it known that I, WILLIAM W. READ, a citizen of the United States, residing at San Antonio, in the county of Bexar and State of Texas, have invented a new and useful Scoop, of which the following is a specification.

The present invention relates to self-measuring scoops, one object of which is to provide a scoop for accurately and expeditiously measuring predetermined quantities of grain and the like.

Another object of the invention is to provide a scoop having an adjustable bottom, which in conjunction with a swinging sweep, provides means for accurately measuring different predetermined quantities within the scoop.

A further object of the present invention is to provide a self-measuring scoop of general improved construction, whereby the device will be simple, durable and inexpensive in construction, as well as convenient, practical, serviceable and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiments in the accompanying drawing, wherein:—

Figure 1 is a perspective view of the scoop depicting the manner of its operation. Fig. 2 is a side elevation of the scoop, partly in section. Fig. 3 is a top plan view of the scoop. Fig. 4 is a detail sectional view taken on the line 4—4 of Fig. 2. Fig. 5 is a perspective view of the securing sleeve.

In carrying out the present invention, there is provided a cylindrical casing or scoop 1, having its top edge terminating in a plane which is at an obtuse angle with respect to the axis of the casing 1. The entire side wall of the casing 1 is helically or spirally corrugated as indicated at 2. A bottom 3 is provided with a depending flange 4 which is provided with helical or spiral corrugations to operably engage the helical corrugations 2. To the lower face of the bottom 3, is secured a strap or handle 5 for rotating the bottom within the casing 1, to thereby adjust the bottom 3 with respect to the said casing 1.

An approximately U-shaped handle 6 is rigidly secured to the side wall of the casing 1 adjacent the top and bottom thereof. This handle has an intermediate portion 7, which is parallel with the axis of the casing 1, and an upper arm 9 the top of which lies in the same plane as the top edge of the casing 1. The handle 6 is U-shaped in cross section and its side walls are folded inwardly upon themselves as indicated at 10, to provide a reinforcement. A transverse strip or plate 11 is secured to the opposed side walls of the angular arm 9 adjacent the folded edge thereof.

In order to provide means for removing all the grain, or the like, that may be supported by the casing 1 and the bottom 3, above the plane of the upper edge of the casing, there is provided a sweep or scraper 12 which is pivoted upon the arm 9 so that its lower edge 13 will lie in the same plane as, and operably engage the upper edge of the casing 1. This sweep is provided at its inner or pivoted end with a transverse cylindrical bearing 14, the axis of which is perpendicular to the lower edge 13 of the sweep or scraper 12. Secured to and extending perpendicularly from the upper face of the arm 9 is a bearing sleeve 15, about which is pivotally secured the bearing 14. A transverse slot 16 is formed in the sleeve 15 for the reception of a pin 17 which is secured to the sleeve 14 to hold the two sleeves in operative engagement. The pin 17 is also, secured to a rod 18 that extends through the bearing sleeve 15 and an aperture 19 formed in the plate 11.

A rod 20 is secured to the sweep or scraper 12 and extends inwardly toward the sleeve and terminating in an eye 21, which normally lies within easy reach of the thumb of the manipulator. To normally hold the sweep to one side of the casing 1, a contracting helical spring 22 is provided, which has one terminal secured to the sweep or scraper 12 and its opposed terminal is secured to the upper face of the arm 9. The swinging or oscillating movement of the sweep 12 against the spring 22 is limited by an upstanding flange or stop 23 formed at the outer end of a flat strip 24, secured to the upper face of the said arm 9.

In practical operation, the quantity of grain or the like, which is desired to be measured by the said device, is initially determined by weighing or any other suitable process. This predetermined quantity of grain is then placed within the scoop or casing 1 and the bottom 3 is rotated, through the instrumentality of the handle 5, until the flange 4 in traversing the helical corrugation 2 causes the bottom 3 to force the grain toward the top of the casing or scoop 1 until the uppermost of said grain lies in the same plane as the edge of the casing or scoop. The scoop, now, is ready to measure the desired and known quantity of grain or analogous substance, and the bottom 3 may be rigidly secured to the casing 1; or if various quantities are to be measured by the same scoop, then each corrugation may indicate a predetermined quantity, in which event, the bottom 3 will be left free to rotate in order to select the proper corrugation.

After dipping up the grain from its container, the manipulator moves or oscillates the sweep 12 across the upper edge of the casing or scoop by pressing his thumb against the eye 21, which action moves or oscillates the sweep 12 across the upper edge of the scoop 1, to thereby remove the superfluous grain that may be heaped above the plane of the upper edge of the casing 1. The eye or thumb piece 21 is then released which allows the spring 22 to withdraw the sweep 12 across the top of the scoop 1 to its initial position, after which the grain may be placed in the desired receptacle.

What is claimed as new is:

1. In a device of the character described, including a cylindrical casing having helical corrugations; an adjustable bottom rotatably mounted in said casing and operably engaging the helical corrugation; a handle rigidly secured to said casing; a manually operated spring controlled sweep pivotally secured to said handle; and a stop member to limit the movement of said sweep against the tension of its spring.

2. In a device of the character described, including a cylindrical casing, having its upper edge terminating in a plane that lies at an angle to the axis of the cylindrical casing, said casing having helical corrugations formed therein; an adjustable bottom rotatably mounted in said casing and operably engaging the helical corrugations; a handle rigidly secured to the said casing; a spring controlled sweep pivotally secured to said handle; a thumb piece carried by said sweep adjacent its pivoted end; and a stop member in the path of travel of the sweep to limit the movement of said sweep against the tension of its spring.

3. In a device of the character described, including a cylindrical casing, having its upper edge terminating in a plane lying at an angle to the axis of said casing, and having helical corrugations formed therein; an adjustable bottom rotatably mounted in said casing; a depending helically corrugated flange extending from said bottom to operably engage the corrugations of said casing; a manipulating handle secured to said bottom; a handle rigidly secured to said casing, the upper terminal of the handle lying in the same plane as the upper edge of the cylindrical casing; a spring controlled sweep pivotally secured to said handle; a thumbpiece carried by said sweep adjacent its pivoted end; and a stop member which lies in the path of travel of said sweep to limit its movement.

4. In a device of the character described, including a cylindrical casing having its upper edge terminating in a plane which lies at an angle to the axis of the cylindrical casing, said casing having helically disposed corrugations; an adjustable bottom rotatably mounted in said casing and operably engaging the helically disposed corrugations; a manipulating handle secured to said bottom; a handle rigidly secured to said casing; an arm formed at the upper end of the handle, said arm being in the same plane as the upper edge of the cylindrical casing; a sleeve rigidly secured to and extending perpendicularly from the upper edge of the arm; said sleeve having a transversely elongated slot formed therein; a cylindrical bearing rotatably mounted on said sleeve; a radial pin rigidly secured to the cylindrical bearing, and slidably received by the transverse slot of the sleeve to hold the cylindrical bearing against any longitudinal movement with respect to said sleeve; a rod rigidly secured to the pin and rotatably mounted in said arm; a sweep extending from said cylindrical bearing, the lower edge of said sweep being adapted to swing in the same plane as the upper edge of the casing; a thumb-piece rigidly secured to said sweep; a helical spring having one end secured to said arm and the opposed end secured to the sweep to normally hold said sweep at one side of the cylindrical casing; and a stop member lying in the path of travel of said sweep to limit its movement against the tension of said helical spring.

5. In a device of the character described, including a cylindrical container which is internally threaded throughout its length; an adjustable bottom threadedly mounted within said container; a manually operated spring controlled sweep pivotally secured to said handle; and a stop member adapted to lie in the path of travel of said sweep to limit the movement thereof.

In testimony that I claim the foregoing as my own, I have hereto affixed my signature in the presence of two witnesses.

WILLIAM WALLACE READ.

Witnesses:
R. A. MUNK,
W. L. McKINLEY.

Copies of this patent may be obtained for five cents each, by addressing the "Commissioner of Patents, Washington, D. C."